United States Patent Office 3,470,624
Patented Oct. 7, 1969

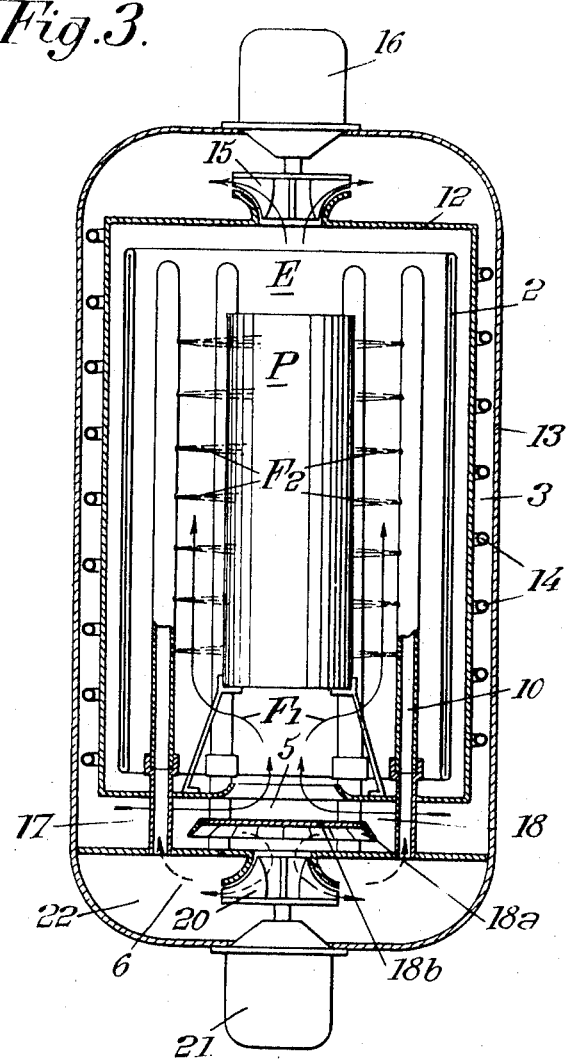

3,470,624
TEMPERING FURNACES AND METHOD
Joseph Plotkowiak, Carrieres-sur-Seine, France, assignor to Societe d'Exploitation des Materiels Hispano-Suiza, Bois-Colombes, France
Filed Dec. 5, 1967, Ser. No. 688,197
Claims priority, application France, Dec. 13, 1966, 87,288
Int. Cl. F26b 7/00; F25b 29/00; C21d 1/48
U.S. Cl. 34—20          19 Claims

ABSTRACT OF THE DISCLOSURE

The furnace comprises a treatment zone in which is located the piece to be treated. A first blower circuit generates a primary flow of cooling gas around the piece. A second blower circuit delivers the cooling gas in the form of a plurality of secondary flows which interact with the primary flow. The secondary flows are oriented at least approximately perpendicular to the direction of the primary flow, and their speeds are at least five times, and preferably at least twenty to thirty times higher than the average speed of the primary flow.

---

The present invention relates to tempering furnaces of the type in which the cooling effect which is to cause the temper of the treated piece is obtained by subjecting that piece, previously heated to a suitable temperature (generally in the treatment zone of the furnace) to the action of a closed circuit flow of cooling gas, means being provided for cooling this gas before it is recycled into the treatment zone.

The invention is more particularly, but not exclusively, concerned with furnaces of this type in which the treatment zone has a longitudinal axis and accordingly lends itself to the treatment of elongated pieces. Such furnaces can, in particular, be furnaces which operate under a partial vacuum.

An object of this invention is to provide tempering furnaces that respond better than in the past to the various practical considerations, in particular with respect to the effectiveness and the homogeneity of the tempering treatment.

According to the present invention, a tempering furnace comprises, principally, a first blower circuit arranged to generate a primary flow of cooling gas around the treated piece, a second blower circuit arranged to deliver the cooling gas in the form of a plurality of secondary flows, whose orientation is perpendicular (at least approximately) to the direction of the primary flow, and whose speed is at least five times, and preferably at least twenty to thirty times, higher than the average speed of the primary flow in the absence of the secondary flows (that speed nevertheless remaining preferably lower than the local speed of sound), the second blower circuit being advantageously diverted from the first blower circuit before the cooling gas is recycled into the treatment zone of the furnace.

Figure 1:
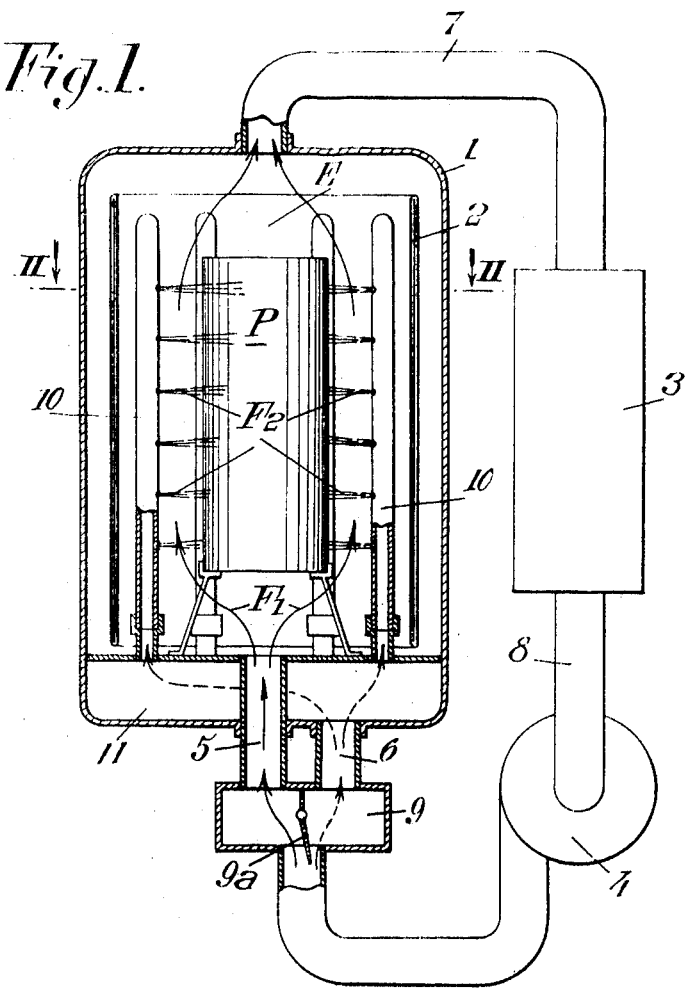
Figure 2:
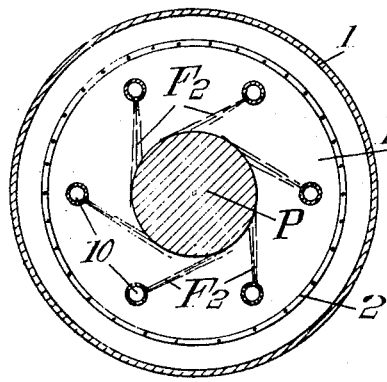

Other features of the invention will become apparent from the following specific description of two preferred embodiments of a furnace according to the invention, given merely by way of example, with reference to the accompanying drawings in which:

FIGURE 1 shows in schematic longitudinal section a furnace conforming to a first embodiment of the invention, FIGURE 2 is a section along II—II of FIGURE 1, and FIGURE 3 shows, under the same conditions as FIGURE 1, a furnace conforming to another embodiment of the invention.

The tempering furnaces shown in the drawings are capable of tempering, by blown cooling gas, an elongated piece P previously heated in the furnace.

With respect to this furnace taken as a whole, it can be of the type which operates under a partial vacuum, and it can be constructed, with the exception of its circuit for the cooling gas, in any appropriate manner, in particular as shown in FIGURE 1, in which the furnace comprises a treatment zone E delimited by an envelope 1 of cylindrical shape housing electric radiant heating elements 2.

The piece P, previously heated to a suitable temperature by the heating elements 2, is then subjected to the action of a closed circuit flow of cooling gas. Means, such as a heat exchanger 3, are provided for cooling this gas before it is recycled into the treatment zone E.

The circulation of the cooling gas can be assured by at least one blower 4, driven by a motor (not shown), and advantageously disposed downstream of the heat exchanger 3.

A first blower circuit 5 is arranged to generate a primary flow ofcooling gas around the treated piece P. Such a primary flow $F_1$, shown by solid line arrows in FIGURES 1 and 3, is preferably oriented parallel to the longitudinal axis of the treated piece P.

In addition, a second blower circuit 6 is arranged to deliver the cooling gas in the form of a plurality of secondary flows $F_2$, shown by broken line arrows in FIGURES 1, 2 and 3. The orientation of these secondary flows $F_2$ is perpendicular (at least approximately) to the direction of the primary flow $F_1$. The direction of these secondary flows $F_2$ depends on the geometry of the treated piece P. The speed of these secondary flows $F_2$ is considerably higher than the average speed of the primary flow $F_1$.

It can be seen that the dynamic effect of the secondary flows $F_2$ on the primary flow $F_1$ has the effect of homongenizing the tempering effect, since the resultant flow conditions to which the treated piece P is subjected are constantly turbulent. Moreover, the speed of cooling of the treated piece P can be regulated without altering the homogeneous character of this resultant flow, from the point of view of temperature.

Preferably, one of the embodiments shown in the drawings is used, according to which the second blower circuit 6 is diverted from the first blower circuit 5, before the cooling gas is recycled into the treatment zone E of the furnace.

Dealing first of all with the embodiment of FIGURES 1 and 2, which relates to a tempering furnace in which the heat exchanger 3 is disposed outside the funrace, a conduit 7 evacuates the cooling gas towards this heat exchanger, after the gas passed through the furnace, whereas a conduit 8, in which the blower 4 is mounted, brings back the cooling gas towards the furnace.

This conduit 8 leads to a distributor 9 which distributed the cooling gas to a first blower circuit 5 and to a second blower circuit 6.

The distributor 9 can advantageously comprise an adjustable valve 9a permitting the adjustment of the quantity of the cooling gas intended to be delivered by the second blower circuit 6.

As for the plurality of secondary flows $F_2$, they are preferably delivered (by the second blower circuit 6), from perforated tubes 10 (having circular, elliptical or elongated perforations) dispersed parallel to the longitudinal axis of the treated piece P. Each of these perforated tubes has a closed end and an open end leading into a supply chamber 11. The orientation of these secondary flows $F_2$ is thus, if the orifices of the perforated tubes 10 are pierced radially and have axes perpendicular to the axis of the tube, perpendicular to the direction of the primary flow $F_1$.

As for the direction of these secondary flows $F_2$, it can be such that, in the case in which the treated piece P has a certain symmetry about its longitudinal axis, each secondary flow $F_2$ is directed tangentially to the treated piece, as illustrated in FIGURE 2.

With respect to the speed of these secondary flows $F_2$, this speed is at least five times, and preferably at least twenty to thirty times, higher than the average speed of the primary flow $F_1$ in the absence of the secondary flows $F_2$, although the speed of the secondary flows $F_2$ should preferably remain lower than the local speed of sound. Furthermore, it is appropriate to increase the speed of the secondary flows $F_2$ from the upstream part (with respect to the primary flow $F_1$) of the treated piece P to the downstream part of this treated piece.

Turning now to the embodiment of FIGURE 3, the same reference figures designate the same members as in FIGURE 1. The embodiment of FIGURE 3 relates to a tempering furnace in which the heat exchanger 3 is disposed inside the furnace.

The furnace then comprises an internal envelope 12, delimiting the treatment zone E in which the treated piece P and the electric radiant heating elements 2 are housed. This internal envelope 12 is surrounded, with play, by an external envelope 13, and the heat exchanger 3, which is formed for example by a tubular network 14 through which passes a cooling liquid, is housed between the internal envelope 12 and the external envelope 13.

The circulation of the cooling gas is then assured by a blower 15, driven by a motor 16, disposed at the outlet of the treatment zone E.

Under these conditions, the cooling gas, after having passed through the tubular network 14, is brought back to the treatment zone E by a passage 17.

This passage 17 leads to a distributor 18 which distributes the cooling gas towards the first blower circuit 5 and towards the second blower circuit 6.

The distributor 18 can advantageously comprise a device which permits the adjustment of the quantity of the cooling gas intended to be delivered by the second blower circuit 6, such a device being advantageously formed by registers 18a.

In a modification (not shown) of this embodiment of the invention, the quantity of the cooling gas intended to be delivered by the second blower circuit 6 can be adjusted by displacing the intermediate plate 18b of the distributor 18 in an axial direction (parallel to the longitudinal axis of the furnace).

With respect to the quantity of gas intended to be delivered by the second blower circuit 6, is should be mentioned that, regardless of what embodiment is adopted, the rate of delivery (by mass) of all the secondary flows taken together can represent from 10% to 50% of the rate of delivery (by mass) of the resilient flow.

Generally, the smaller the rate of delivery (by mass) is of all the secondary flows taken together, the higher the speed is of these flows, and conversely, the higher the rate of delivery (by mass) is of all the secondary flows taken together, the lower the speed is of these flows.

In addition, an auxiliary blower 20 is provided, driven by a motor 21, mounted in the second blower circuit 6. The auxiliary blower 20 delivers the cooling gas into an over-pressure supply chamber 22 in which the perforated tubes 10 communicate by their open ends. The pressure in the second blower circuit 6 is, under these conditions, higher than the pressure in the first blower circuit 5.

Means can be provided for varying the speed of the motor 21 driving the auxiliary blower 20, and accordingly, for varying the pressure in the second blower circuit 6.

As shown in FIGURES 1 and 3, the perforated tubes 10 are advantageously mounted so that they can rotate about their axes, which permits the direction of the secondary flows that they deliver to be varied.

Besides, according to a feature which is not shown, means can be provided for varying the direction of the secondary flows $F_2$ during the treatment. Such means advantageously comprise a mechanism adapted to drive each perforated tube in a rotary movement of given amplitude about its axis.

It is also appropriate to mention that the perforated tubes can be provided with orientable nozzles in order to adjust the direction of the secondary flows. Such orientable nozzles are useful for the treatment of pieces of complex shapes.

Still with a view to the treatment of pieces of complex shapes, the perforated tubes can be provided with orifices which are pierced radially but which have axes inclined with respect to the axis of the tube, the inclination of these axes being such that they are (at least approximately) perpendicular to the direction of the primary flow. Under these conditions, a set of perforated tubes can be provided for each type of treated piece.

In addition, it should be noted, that whatever embodiment is adopted, it is advantageous to provide a type of fastening for the perforated tubes which permits rapid dismantling of these tubes (for example a fastening by simply sliding the tubes into corresponding housings) with a view to their replacement (cleaning, putting in place another set of perforated tubes, etc.).

The present invention provides a furnace in which the tempering treatment is particularly effective and homogeneous due to the dynamic effect of the secondary flows on the primary flow; this effect constantly maintains turbulent conditions in the resultant flow to which the treated piece is subjected. Moreover, the speed of cooling of this treated piece can be regulated without altering the homogeneous character of the tempering effect.

Although the invention has been described with reference to a furnace of the type which operates under a partial vacuum, it is clear that the invention can be applied equally well to conventional furnaces. Furthermore, various modifications and variations are possible without departing from the spirit or scope of the present invention.

What I claim is:
1. A tempering furnace comprising
   a treatment zone in which a piece to be tempered is placed for tempering,
   circulating means for cyclically circulating, in closed circuit, a cooling gas through said treatment zone, said circulating means comprising,
   cooling means for cooling said cooling gas before it is recycled into said treatment zone,
   a first blower circuit means for delivering a primary flow of part of said cooling gas around said piece,
   and a second blower circuit means for delivering another part of said cooling gas in the form of a plurality of secondary flows which interact with said primary flow to produce a resultant flow which is substantially turbulent in the vicinity of the piece to be tempered, said second blower circuit delivering said secondary flows with orientations which are substantially perpendicular to the direction of the primary flow and with speeds which are at least five times higher than the average speed which the primary flow would have in the absence of the secondary flows.

2. A furnace according to claim 1 in which said secondary flows have speeds which are at least twenty times higher than the average speed which the primary flow would have in the absence of the secondary flows.

3. A furnace according to claim 1 in which said secondary flows have speeds which are at least thirty times higher than the average speed which the primary flows would have in the absence of the secondary flows.

4. A furnace according to claim 1 in which heating means are provided for heating said piece in said treatment zone.

5. A furnace according to claim 1 in which diverting means are provided for diverting said second blower circuit from said first blower circuit before said cooling gas is recycled into said treatment zone.

6. A furnace according to claim 1 in which said treatment zone has a longitudinal axis and is adapted to receive an elongated piece to be treated, said second blower circuit including a plurality of perforated tubes adapted to deliver the cooling gas through their perforations, said perforated tubes being disposed parallel to the longitudinal axis of said treatment zone, each of said perforated tubes having one closed end and one open end communicating with a supply chamber adapted to supply said cooling gas.

7. A furnace according to claim 1 in which said second blower circuit is adapted to direct said secondary flows tangentially to said treated piece.

8. A furnace according to claim 1 in which the speeds of the secondary flows directed onto an upstream part, with respect to the primary flow, of the treated piece is higher than the speeds of the secondary flows directed onto a downstream part of the treated piece.

9. A furnace according to claim 1 in which regulating means are provided for regulating the quantity of cooling gas to be delivered by said second blower circuit.

10. A furnace according to claim 9 in which said second blower circuit is adapted to deliver 10% to 50%, by mass, of the total delivery of the first and second blower circuits.

11. A furnace according to claim 1 in which said second blower circuit is adapted to generate a higher pressure of the cooling gas than said first blower circuit.

12. A furnace according to claim 1 in which means are provided for varying the pressure in the second blower circuit.

13. A furnace according to claim 6 in which said perforated tubes are rotatably mounted to be able to rotate about their axes.

14. A furnace according to claim 6 in which means are provided for varying the direction of said secondary flows during tempering, these last mentioned means comprising a mechanism adapted to drive each perforated tube in a rotary movement of given amplitude about its axis.

15. A furnace according to claim 6 in which said perforated tubes are provided with orientable nozzles.

16. A furnace according to claim 6 in which the perforations of said perforated tubes have axes inclined with respect to the axis of the tube, the inclination of these axes being such that they are substantially perpendicular to the direction of the primary flow.

17. A furnace according to claim 6 in which fastening means are provided for the perforated tubes permitting rapid dismantling of said tubes.

18. A method of tempering a piece comprising the steps of
generating a primary flow of cooling gas about said piece,
and delivering a plurality of secondary flows interacting with the primary flow to produce a resultant flow which is substantially turbulent in the vicinity of the piece to be tempered,
said secondary flows being delivered with orientations which are substantially perpendicular to the direction of the primary flow and with speeds which are at least five times higher than the average speed which the primary flow would have in the absence of the secondary flows.

19. A method according to claim 18 in which the primary and secondary flows are continuously circulated in closed circuit and recycled onto the piece, said primary and secondary flows being cooled before being recycled onto said piece, and said secondary flows being diverted from said primary flow before said primary and secondary flows are recycled onto said piece.

References Cited

UNITED STATES PATENTS 3,159,387  1/1964  Campbell et al. _____ 263—40

FOREIGN PATENTS 930,063  7/1963  Great Britain.

JOHN J. CAMBY, Primary Examiner

U.S. Cl. X.R.

148—16; 165—61; 263—40; 266—5